(12) United States Patent
Burk

(10) Patent No.: US 6,676,343 B2
(45) Date of Patent: Jan. 13, 2004

(54) HOLE ENLARGING BIT FOR POWER DRILLS

(76) Inventor: Donald E. Burk, 510 Wilmington, #2, San Antonio, TX (US) 78212

( * ) Notice: Subject to any disclaimer, the term of this patent is extended or adjusted under 35 U.S.C. 154(b) by 109 days.

(21) Appl. No.: 09/969,282

(22) Filed: Oct. 2, 2001

(65) Prior Publication Data

US 2003/0063956 A1 Apr. 3, 2003

(51) Int. Cl.[7] .............................................. B23B 51/04
(52) U.S. Cl. ........................ 408/204; 408/201; 408/209
(58) Field of Search ............................. 408/201, 204, 408/206, 209, 225, 80, 82

(56) References Cited

U.S. PATENT DOCUMENTS

| | | | | |
|---|---|---|---|---|
| 2,779,361 A | * | 1/1957 | McKiff | 408/204 |
| 2,874,616 A | | 2/1959 | Cardinal | |
| 3,559,513 A | * | 2/1971 | Hougen | 408/204 |
| 3,778,179 A | * | 12/1973 | Rivas | 408/206 |
| 4,551,045 A | * | 11/1985 | Bossler | 408/206 |
| 4,749,315 A | * | 6/1988 | Mills | 408/209 |
| 4,968,189 A | * | 11/1990 | Pidgeon | 408/1 R |
| 5,143,489 A | | 9/1992 | Bogner et al. | 408/1 R |
| 5,366,326 A | | 11/1994 | Converse | 408/72 B |
| 5,624,213 A | * | 4/1997 | Anderson | 408/206 |
| 5,871,310 A | | 2/1999 | Mortensen | 408/1 R |
| 6,065,909 A | * | 5/2000 | Cook | 408/206 |

FOREIGN PATENT DOCUMENTS

| | | | | |
|---|---|---|---|---|
| JP | | 10415 | * 1/1983 | ................. 408/206 |

* cited by examiner

Primary Examiner—Daniel W. Howell
(74) Attorney, Agent, or Firm—Sturm & Fix LLP

(57) ABSTRACT

A drill bit 10 for creating and using a pilot hole 101 in a workpiece 100 to produce a finished hole 102 in the workpiece 100 centered around the pilot hole 101 wherein the drill bit 10 includes an enlarged cutting head member 30 mounted in a concentric relationship to an elongated guide head member 40 wherein both of the head members 30 40 are mounted on a shaft member 20 connected to a power drill 200 such that the elongated guide head member 40 engages the sides of a pilot hole 101 in a workpiece 100 to act as a guide element for the enlarged cutting head member 30 to create the enlarged finished hole 102 in the workpiece.

7 Claims, 1 Drawing Sheet

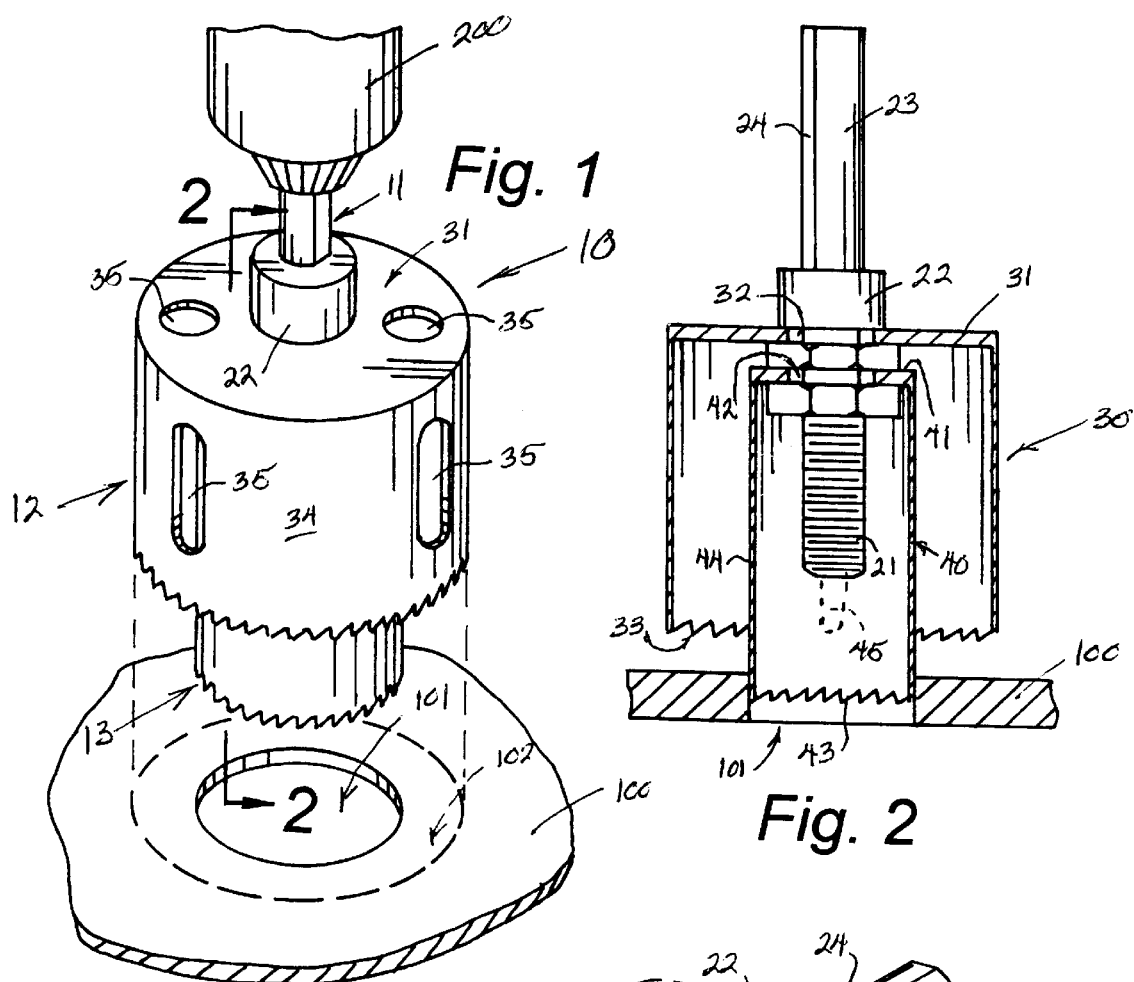
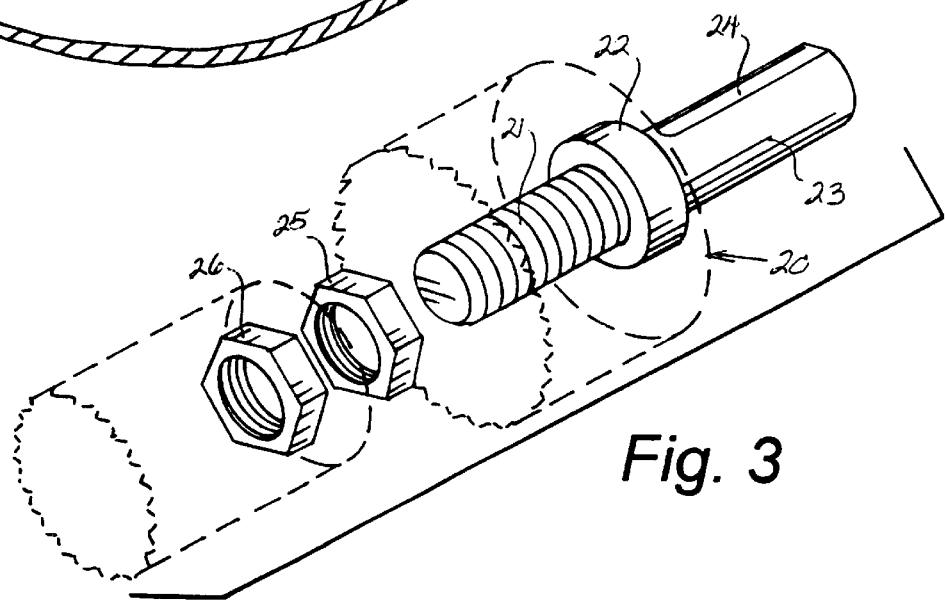

though the US 6,676,343 B2

HOLE ENLARGING BIT FOR POWER DRILLS

CROSS REFERENCE TO RELATED APPLICATIONS

Not Applicable.

BACKGROUND OF THE INVENTION

1. Field of the Invention

The present invention relates to the field of hole enlarging methods and apparatus and in particular to a pilot hole drilling and guiding arrangement for drilling enlarged holes using an existing hole as a pilot guide.

2. Description of Related Art

As can be seen by reference to the following U.S. Pat. Nos. 5,871,310; 2,874,616; 5,143,489; 5,366,326, the prior art is replete with myriad and diverse hole drilling arrangements.

While all of the aforementioned prior art constructions are more than adequate for the basic purpose and function for which they have been specifically designed, they are uniformly deficient with respect to their failure to provide a simple, efficient, and practical device that employs an existing pilot hole to guide an enlarged cutter head into the workpiece in a continuous operation.

As most craftsmen are all too well aware, an inordinate amount of time is expended in enlarging existing pilot holes in workpieces which must then be subjected to a cutting process with or without the use of a separate guide element to enlarge the radius of an existing pilot hole to arrive at an enlarged finished hole diameter.

As a consequence of the foregoing situation, there has existed a longstanding need among craftsmen for a new and improved cutting drill bit arrangement wherein the pilot hole guide is axially aligned with and projects outwardly from the finished hole drill bit so that the pilot hole guides the finished hole drill bit in a single continuous sequence; and the provision of such an arrangement is the stated objective of the present invention.

BRIEF SUMMARY OF THE INVENTION

Briefly stated, the hole enlarging drill bit that forms the basis of the present invention comprises in general a shaft unit, a pilot hole guiding unit and a finished hole cutting unit deployed in a concentric staggered fashion on the shaft unit.

As will be explained in greater detail further on in the specification, the pilot hole guiding unit fits inside and projects beyond the lower end of the finished hole cutting unit such that after the shaft unit has been operatively connected to a conventional power drill, the power drill can be actuated to enlarge the radius of the existing pilot hole.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the hole enlarging drill bit that forms the basis of this invention in use on a workpiece;

FIG. 2 is a cross-sectional view taken through line 2—2 of FIG. 1; and,

FIG. 3 is an exploded perspective view of the shaft unit with the pilot hole and finished hole cutting units depicted in phantom.

DETAILED DESCRIPTION OF THE INVENTION

As can be seen by reference to the drawings, and in particular to FIG. 1, the hole enlarging drill bit that forms the basis of the present invention is designated generally by the reference number 10. The drill bit 10 comprises in general a shaft unit 11, a finished hole cutting unit 12, and a pilot hole guiding unit 13. These units will now be described in seriatim fashion.

As can best be seen by reference to FIG. 3, the shaft unit 11 comprises an elongated shaft member 20 having a threaded lower portion 21, an intermediate portion provided with an enlarged collar element 22 and a generally smooth cylindrical upper portion 23 provided with a vertical recess 24 that forms a gripping or key surface that is engageable by a conventional power drill gripping collar 200 as depicted in FIG. 1.

In addition, the shaft unit 11 also includes a pair of locking nuts 25 and 26 which are adapted to threadedly engage the threaded lower portion 21 of the shaft member 20 in a well recognized fashion; and whose purpose and function will be described in greater detail further on in the specification.

Turning now to FIGS. 1 and 2, it can be seen that the finished hole cutting unit 12 comprises an enlarged diameter, generally hollow cylindrical cutting head member 30 having a substantially closed upper end 31 provided with a central aperture 32 whose diameter is less than the diameter of the enlarged collar element 22 on the shaft member 20 and the effective diameter of the first locking nut 25 which allows the enlarged diameter cutting head member 30 to be affixed to the shaft member 20 in a well recognized fashion.

In addition, the lower end of the enlarged diameter cutting head member 30 is provided with a saw toothed cutting array 33 wherein the outside diameter of the enlarged cutting head member 30 is chosen to conform to the diameter of the desired enlarged hole 102 in the workpiece 100.

As can also be seen by reference to FIG. 1, both the generally closed upper end 31 of the enlarged cutting head member 30, as well as the cylindrical sidewalls 34, are provided with apertures 35 that allow both air circulation within the enlarged cutting head member 30 as well as a means for shavings produced thereby to escape from the confines of the enlarged cutting head member 30.

Returning once more to FIGS. 1 and 2, it can be seen that the pilot hole guiding unit 13 comprises a reduced diameter elongated guide head member 40 having a generally closed upper end 41 provided with a central aperture 42 dimensioned to receive the threaded lower portion 21 of the shaft member 20 and having an open lower end provided with an optional saw toothed cutting array 33 whose outside diameter is the same as the diameter of the pilot hole 101 that has been previously formed in the workpiece 100.

In addition, both the upper end 41 and the elongated sidewalls 44 of the elongated guide head member 40 may be provided with a plurality of apertures 45, one of which is depicted in phantom in FIG. 2 for the purposes of cooling and sliver or shavings elimination as mentioned previously.

Furthermore, as shown in FIGS. 1 and 2, the elongated guide head member 40 is intended to be concentrically aligned with and project beyond the lower end of the enlarged cutting head member 30 by captively engaging the elongated guide head member 40 intermediate the locking nuts 25 26 on the threaded portion 21 of the shaft member 20 in a well recognized fashion.

Still referring to FIGS. 1 and 2, it can be appreciated that the hole enlarging drill bit 10 of this invention is adapted to be operatively attached to a power drill 200 that rotates the drill bit 10 to remove selected portions of a workpiece 100.

Once the pilot hole 101 has been formed, the sidewalls 44 of the elongated guide head member 40 cooperate with the sidewalls in the workpiece 100 surrounding the pilot hole 101 to guide the saw toothed lower end 33 of the enlarged cutting head member 30 into engagement with the workpiece 100 to create the finished hole 102 therein.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

I claim:

1. A hole enlarging drill bit for use with a power drill to guide a larger hole saw through an existing hole;

a shaft unit including a shaft member having an upper portion adapted to be engaged in a power drill, an intermediate portion provided with an enlarged collar element and a lower portion, wherein, the shaft member is elongated and the lower portion of the shaft member is threaded; and wherein, the shaft unit further comprises first and second locking nuts adapted to threadedly engage the lower portion of the shaft member;

a pilot hole guiding unit adapted to be operatively connected to the lower portion of the shaft member and including a reduced diameter relatively elongated guide head member having a lower end provided with an outside diameter that coincides with the diameter of a pre-existing pilot hole formed in a workpiece; and, a finished hole cutting unit operatively associated with and disposed in a concentric relationship relative to the pilot hole guiding unit and including an enlarged cutting head member whose diameter is greater that the diameter of the pilot hole cutting unit and having a lower end provided with a saw toothed array whose outside diameter coincides with the diameter of a finished hole in a workpiece; wherein, the lower end of the guide head is disposed below said saw toothed array.

2. The drill bit as in claim 1; wherein, the enlarged cutting head member has an upper portion provided with a central aperture dimensioned to receive the lower portion of the shaft member.

3. The drill bit as in claim 2; wherein, said first locking nut is adapted to captively engage the upper portion of the enlarged cutting head member against the enlarged collar on the intermediate portion of the shaft member.

4. The drill bit as in claim 3; wherein, the enlarged cutting head member has an upper portion provided with a central aperture dimensioned to receive the lower portion of the shaft member.

5. The drill bit as in claim 4, wherein, said second locking nut is adapted to captively engage the upper portion of the elongated guide head member against said first locking nut.

6. The drill bit as in claim 1; wherein, both the elongated guide head member and the enlarged cutting head member are provided with sidewalls and the sidewalls of at least one of the head members are provided with a plurality of apertures.

7. The drill bit as in claim 5; wherein, both the elongated guide head member and the enlarged cutting head member are provided with sidewalls and the sidewalls of at least one of the cutting head members is provided with a plurality of apertures.

* * * * *